Aug. 4, 1925.
H. W. DYER
1,548,124
BUMPER FOR AUTOMOBILES
Filed March 25, 1922
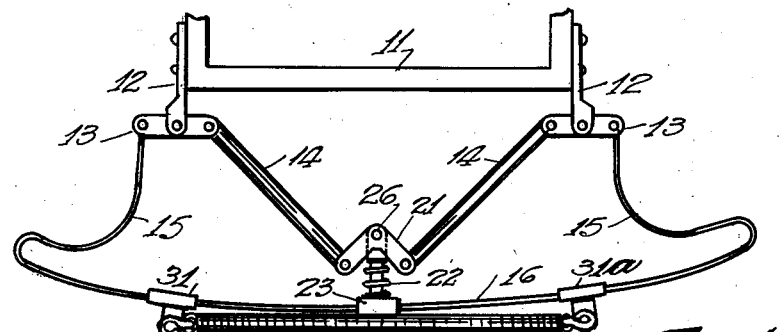
Fig.1
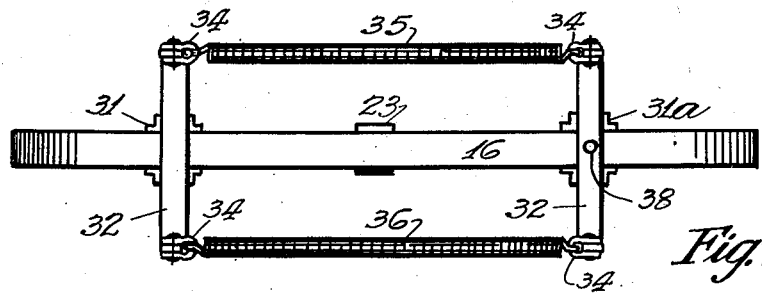
Fig.2
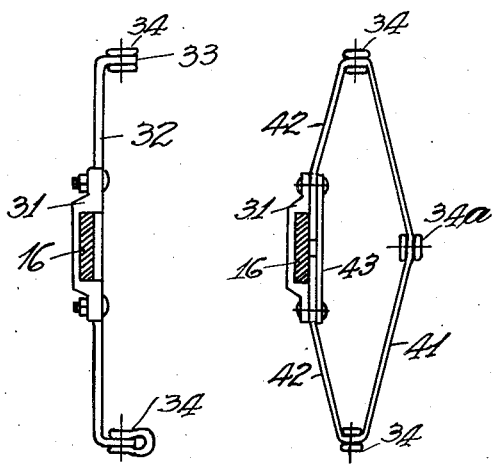
Fig.3  Fig.4
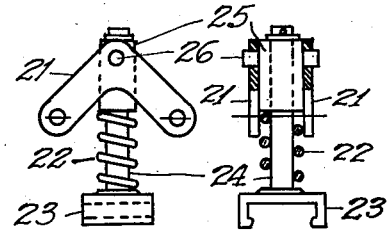
Fig.5  Fig.6
Harry W Dyer INVENTOR.
BY
 ATTORNEY.

Patented Aug. 4, 1925.

1,548,124

UNITED STATES PATENT OFFICE.

HARRY W. DYER, OF NEW YORK, N. Y.

BUMPER FOR AUTOMOBILES.

Application filed March 25, 1922. Serial No. 546,683.

*To all whom it may concern:*

Be it known that I, HARRY W. DYER, a citizen of the United States, and a resident of New York city, in the county of New York and State of New York, have invented certain new and useful Improvements in Bumpers for Automobiles, of which the following is a specification.

This invention relates to automobile bumpers or fenders which may be applied to the front and rear of automobiles to act as guards or fenders against obstacles in the right of way and it has for an object to increase the effective area of fenders of this type and also to provide an easy yielding member that will take up the initial jar of an obstacle in the path of the automobile. It also includes a bracket attachment that may be secured to any standard make of bumper to increase its effective area in front of the car, and a further object of this invention is to provide a reenforcing support to the centre of the main impact member in a novel manner. This invention is in part a continuation of the invention shown in United States Patent #1,393,354 issued to me on October 11, 1921. The objects and the method of carrying out this invention will be more particularly understood from the following specification and the accompanying drawings in which Fig. 1 is a plan view of my invention complete, applied to an automobile chassis, Fig. 2 is a front elevation corresponding to Fig. 1, Fig. 3 shows a side elevation of a bracket attachment and Fig. 4 is a bracket attachment alternative to Fig. 3, Figs. 5 and 6 show details of the central support for the main impact member of the bumper.

A certain type of construction has been established in the manufacture of automobile bumpers or fenders consisting of a single impact bar supported in a horizontal plane in front and rear of the car. It has been found in practice that this bar is not wide enough to cover a sufficient area so that when a car collides with another car, the bumper will always align. In order to meet this condition the present invention provides for a pair of vertical arms, one placed on each side of the main bumper bar and which will engage the bumper bar of another car that has considerable variation in its elevation from the ground. Between these vertical arms coil springs are stretched which extend somewhat in front of the main impact member. These coil springs will readily yield to an initial impact and thus if a person is struck by a car, these springs will very materially reduce the force of the impact and thereby lessen the injury that would otherwise be inflicted. This is secured to the automobile chassis by a floating lever construction as described in the patent above referred to, the thrusts from these floating levers being imparted to a floating lever on the centre in the form of a bell crank, thereby tending to maintain the floating levers in alignment.

Referring to the drawings, as shown in Fig. 1, the bumper is symmetrical about the centre axis, having corresponding parts on either side indicated by similar reference characters. The automobile chassis is indicated by 11, the brackets are indicated by 12, supporting the floating levers 13. This construction may be similar to that shown in United States Patent #1,375,834. 14 indicates the thrust rods, 16 indicates the main impact member of the bumper or guard and 15 indicates the reversely curved ends of the guard 16 which connect to the floating lever 13. The thrust rods 14 connect to the bell crank 21, pivoted at 26, in the block 25 which slides on the plunger 24, best shown in Figs. 5 and 6, and tension is applied to the thrust rods 14 by the coil spring 22. A jaw or bracket 23 is provided on the end of the plunger 24 to engage the bumper bar 16. It will be noted that bell cranks 21 as indicated in Fig. 6 are provided in duplicate, thus forming a jaw between the ends of these cranks to which the thrust rods 14 are connected and the floating levers 13 may be similarly provided in duplicate as shown in the patent above referred to.

The vertical arms are indicated by 32, secured to the bumper bar 16 by the enfolding bracket 31. This bracket securely clamps the arms 32 so that they do not slide on the bar 16. The ends of this bracket 31 may be turned outwards as indicated at 33 and these ends are provided with shackles or eyelets 34 into which the ends of the coil springs 35 and 36 are hooked as indicated in Figs. 1 and 2. If desirable, one of these vertical arms may be pivoted to the bracket 31$^a$ as indicated at 38 on the right side of Fig. 2. This would enable the bracket to swing about the pivot in case one of the springs was deflected more than the other and thus distribute the strain between the springs 35 and 36. The alternative construction shown in Fig. 4 differs from that shown in Fig. 3, in the substitution of an elliptical spring 42, for the vertical arms 32. This spring is secured by a clamping plate 43 to the bracket 31 and has an additional shackle or eyelet 34ª, on the centre, thus providing for three parallel coil springs. A construction of this kind has more resiliency than that shown in Fig. 3 and would be preferable for light cars. This construction also has no exposed ends to engage or conflict with objects on the right of way.

Having thus described my invention, I claim:

1. In a bumper of the class described, the combination of a chassis with an impact member, the ends of said member secured to said chassis, a connection to the middle of said member including a floating lever, a spring support associated with said lever and thrust connections from the ends of said floating lever to said chassis.

2. In a bumper of the class described, the combination of a chassis with a spring impact member, the ends of said member secured to said chassis, a connection to the middle of said member, said connection including a plunger, a sleeve on said plunger, a floating lever pivoted to said sleeve and thrust rods connecting the end of said lever with said chassis.

3. In a bumper of the class described, the combination of a chassis with a spring impact member, the ends of said member connected through floating levers to said chassis, a connection to the middle of said member, said connection including a pivoted lever and rods connecting the ends of said pivoted lever with the ends of said floating levers.

4. In a bumper of the class described, the combination of a chassis with a spring impact member, the ends of said member connected through floating levers to said chassis, a connection to the middle of said member, said connection including a bell crank with its ends turned toward said member and thrust rods connecting the ends of said bell crank with said floating levers.

5. In a bumper of the class described, the combination of a chassis with a spring impact member, the ends of said member connected through floating levers to said chassis, a connection to the middle of said member, said connection including a bell crank with its ends turned toward said member, thrust rods connecting the ends of said bell crank with said levers and a coil spring applying tension to said thrust rods.

6. In a bumper of the class described, the combination of a chassis with a spring impact member, the ends of said member connected to said chassis, a pair of vertical arms in the form of an elliptical spring with the center part projecting beyond the ends secured by brackets in front of said impact member and a plurality of horizontal coil springs connecting said elliptical springs.

7. In a bumper of the class described, the combination of a chassis with a spring impact member connected to said chassis, a vertical arm rigidly secured by a bracket to said member, a second vertical arm pivoted to a bracket secured to said member and coil springs connecting said arms.

Signed at New York city, in the county of New York and State of New York, this 23rd day of November, A. D. 1921.

HARRY W. DYER.